United States Patent
Yamagishi et al.

(10) Patent No.: US 7,407,540 B2
(45) Date of Patent: Aug. 5, 2008

(54) COLORING LIQUID, INK TANK, RECORDING UNIT, RECORDING APPARATUS AND RECORDING METHOD

(75) Inventors: Yuko Yamagishi, Musashino (JP); Yasuaki Murai, Kawasaki (JP); Takeshi Miyazaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 186 days.

(21) Appl. No.: 11/354,205

(22) Filed: Feb. 14, 2006

(65) Prior Publication Data
US 2006/0197815 A1    Sep. 7, 2006

(30) Foreign Application Priority Data
Feb. 15, 2005    (JP)    ............................. 2005-037415

(51) Int. Cl.
*C09D 11/00* (2006.01)
*C09D 11/02* (2006.01)
*B41J 2/01* (2006.01)

(52) U.S. Cl. .............. 106/31.43; 106/31.46; 106/31.47; 106/31.49; 106/31.75; 106/31.76; 106/31.77; 106/31.78; 347/100

(58) Field of Classification Search .............. 106/31.43, 106/31.75, 31.46, 31.47, 31.49, 31.76, 31.77, 106/31.78; 347/100
See application file for complete search history.

(56) References Cited

U.S. PATENT DOCUMENTS

| | | | | | |
|---|---|---|---|---|---|
| 3,535,347 | A | * | 10/1970 | Bitterli | .................. 552/109 |
| 3,925,094 | A | * | 12/1975 | Papenfuss et al. | ........... 106/493 |
| 7,094,812 | B2 | * | 8/2006 | Banning et al. | ............. 523/160 |
| 7,264,910 | B2 | * | 9/2007 | Toyoda et al. | .......... 430/108.21 |
| 7,288,357 | B2 | * | 10/2007 | Toyoda et al. | .......... 430/137.17 |

FOREIGN PATENT DOCUMENTS

JP    08-333517 A    12/1996

\* cited by examiner

*Primary Examiner*—Helene Klemanski
(74) *Attorney, Agent, or Firm*—Rossi, Kimms & McDowell LLP (57) ABSTRACT

A coloring liquid can form an image showing a high color developability and a high vividness as well as an excellent water fastness when used as recording material with a recording technique such as ink-jet printing. An ink tank, a recording unit, a recording apparatus and a recording method are adapted to use such a coloring liquid. Such a coloring liquid contains at least one colorant compound having a structure represented by the general formula (1) below and an ink tank, a recording unit, a recording apparatus and a recording method are adapted to use such a coloring liquid.

General Formula (1)

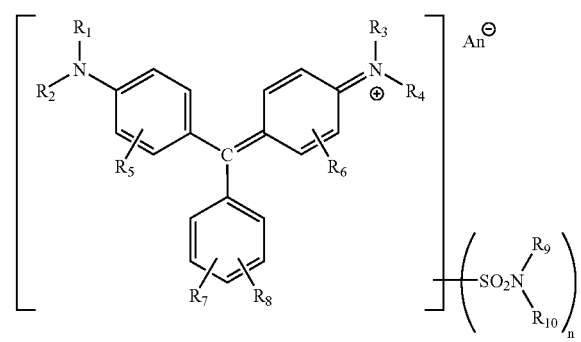

19 Claims, 4 Drawing Sheets

COLORING LIQUID, INK TANK, RECORDING UNIT, RECORDING APPARATUS AND RECORDING METHOD

BACKGROUND OF THE INVENTION

1. Field of the Invention

This invention relates to a coloring liquid containing a novel colorant compound, an ink tank using such a coloring liquid, a recording unit, a recording apparatus and a recording method.

2. Related Background Art

The widespread use of personal computers in ordinary households and the technological developments in the field of digital cameras are closely related to each other and have given rise to a synergetic effect of rapid popularization of hard copy techniques such as ink-jet recording for outputting electronic data to recording mediums.

While ink-jet recording can now provide high quality images that are comparable with images produced by silver halide photography due to the advancement of the ink-jet recording technology in recent years, various additional requirements have been posed to ink-jet recording including environmental stability of recorded images. Images printed on plain paper by means of inks prepared for ink-jet recording are accompanied by such problems that the image can become easily blurred and distorted by water, which problem by turn gives high priority to the requirement of water fastness. Thus, inks to be used for ink-jet recording are required to form images that are excellent in terms of both image quantity and water fastness. A high quality image refers to an image showing an enhanced degree of saturation and colorability.

Known techniques for providing high quality recorded images with cyan color by ink-jet recording includes one that uses as coloring agent a colorant compound having a triphenylmethane skeleton that shows a cyanic color tone. Generally, triphenylmethane compounds show a high molar absorption coefficient and ink that contains the colorant compound operates excellently in terms of color developability, vividness and colorability. It is known that the water fastness of printed products is improved by using inks containing a water-insoluble colorant. Either a pigment or an oil-soluble dye may be used as water-insoluble colorant.

For example, an ink composition containing a dye that has a triphenylmethane skeleton and shows a cyanic color tone has been proposed. (see Japanese Patent Application Laid-Open Application No. H08-333517). While the technique disclosed in the patent document can provide high quality recorded images, the colorant compound used in the ink composition is soluble in alcohol type solvents but poorly soluble in organic solvents to make its water fastness. insufficient.

The use of aqueous inks containing a pigment and a dye has been proposed to satisfy both the requirement of a high image quality and that of water fastness of images recorded by ink-jet recording (see Japanese Patent Application Laid-Open Application No. 2004-143336). The proposed technique is intended to meet the above requirements by using pigments that are characterized by high durability and high color density and dyes that show an enhanced degree of saturation. However, while an image printed by means of aqueous inks containing a pigment and a dye shows a high degree of water fastness, the saturation (color vividness) of the image is not satisfactory in terms of cyanic color tone as indicated by the L*a*b* colorimetric system. In other words, there is a demand for inks containing a colorant compound that are excellent in terms of cyanic color tone in order to improve the quality of images printed by ink-jet recording.

SUMMARY OF THE INVENTION

In view of the above identified circumstances, it is therefore an object of the present invention to provide a coloring liquid that can form an image showing a high color developability and a high vividness as well as an excellent water fastness when used as recording material with a recording technique such as ink-jet printing (to be referred to as "ink" hereinafter if appropriate). Particularly, such a coloring liquid shows a cyanic color tones.

Another object of the present invention is to provide an ink tank, a recording unit, a recording apparatus and a recording method for using such a coloring liquid.

According to the present invention, the above objects and other objects of the invention are achieved by providing a coloring liquid comprising at least a colorant compound having a structure represented by general formula (1) below:

General formula (1)

wherein
each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or —$SO_2NR_9R_{10}$, wherein each of $R_9$ and $R_{10}$ independently denotes a hydrogen atom, an alkyl group, an aryl group or an aralkyl group and may form a heterocycle with a nitrogen atom. Additionally, in the general formula (1), n denotes an integer between 1 and 3. If neither $R_7$ nor $R_8$ is —$SO_2NR_9R_{10}$, at least one of the $R_1$ through $R_4$ is an alkylene group, an arylene group or an aralkylene group having —$SO_2NR_9R_{10}$ as a substituent. In the general formula (1), An denotes a counter anion, which is not necessary when a counter anion exists in the molecule.

Preferably, in a coloring liquid according to the invention as defined above, the colorant compound having the structure as represented by the general formula (1) has a structure represented by general formula (2) below and contains a dispersant and water:

General formula (2)

General Formula (1)

where $R_9$ and $R_{10}$ independently denotes a hydrogen atom, an alkyl group, an aryl group or an aralkyl group and may form a heterocycle with a nitrogen atom.

According to the present invention, there is also provided a coloring liquid for use in an ink-jet recording system that is a coloring liquid according to the invention as defined above.

According to the present invention, there are also provided an ink tank, a recording unit, a recording apparatus and a recording method for using a coloring liquid according to the invention.

A colorant compound having a structure represented by the general formula (1) has a triphenylmethane skeleton and shows a cyanic color tone. Additionally, like ordinary triphenylmethane compounds, it shows a large molar absorption coefficient, and a coloring liquid containing the colorant compound shows a high color developability and a high vividness as well as a high colorability.

Since the colorant compound can be controlled for its solubility in organic solvents, particularly non-polar solvents, the image formed by using a coloring liquid containing the colorant compound shows an excellent water fastness.

Therefore, it is possible to obtain recorded/printed article that show a high colorability, a high vividness and an excellent water fastness.

DETAILED DESCRIPTION OF THE PREFERRED EMBODIMENTS

Now, the present invention will be described in greater detail by way of preferred embodiments of the present invention.

Firstly, a colorant compound having a structure represented by the general formula (1) below that is to be contained in a coloring liquid according to the invention will be described in detail.

wherein
each of $R_1$ through $R_4$ independently denotes a hydrogen atom, an alkyl group that may be substituted, an aryl group that may be substituted or an aralkyl group that maybe substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or $-SO_2NR_9R_{10}$, wherein each of $R_9$ and $R_{10}$ independently denotes a hydrogen atom, an alkyl group, an aryl group or an aralkyl group and may form a heterocycle with a nitrogen atom. Additionally, in the general formula (1), n denotes an integer between 1 and 3. If neither $R_7$ nor $R_8$ is $-SO_2NR_9R_{10}$, at least one of the $R_1$ through $R_4$ is an alkylene group, an arylene group or an aralkylene group having $-SO_2NR_9R_{10}$ as a substituent. In the general formula (1), An denotes a counter anion, which is not necessary when a counter anion exists in the molecule.

A colorant compound having a structure represented by the above general formula (1) can be controlled for its solubility in organic solvents by changing the type of amines used at the time of sulfonamidation of the sulfonic acid group in the process of manufacturing the colorant compound. A coloring liquid prepared by using the colorant compound shows a vivid cyanic color tone and can be used as a coloring material, preferably as a recording material for recording image information because of its spectral characteristics.

Alkyl groups that can be used for each of $R_1$ through $R_4$ in the above general formula (1) include a methyl group, an ethyl group, an n-propyl group, an isopropyl group, an n-butyl group, a sec-butyl group, a tert-butyl group, an n-pentyl group and an n-hexyl group. Aryl groups that can be used for each of $R_1$ through $R_4$ include a phenyl group, a 1-naphthyl group and a 2-naphthyl group. Aralkyl groups that can be used for each of $R_1$ through $R_4$ include a benzyl group and a phenethyl group. $R_1$ and $R_3$ (or $R_1$ and $R_4$) may be the same with or different from each other, and $R_2$ and $R_4$ (or $R_2$ and $R_3$) may be the same with or different each other, although they are preferably the same from the viewpoint of color tone and raw material cost. It is particularly preferable that they are all ethyl groups or that $R_1$ and $R_3$ (or $R_1$ and $R_4$) are ethyl groups and $R_2$ and $R_4$ (or $R_2$ and $R_3$, whichever appropriate) are benzyl groups. These substituents may be substituted by $-SO_2NR_9R_{10}$.

Alkyl groups that can be used for each of $R_5$ and $R_6$ in the above general formula (1) include a methyl group, an ethyl group, an n-propyl group and an isopropyl group. Preferably, each of $R_5$ and $R_6$ may be either a hydrogen atom or a methyl group.

The amino group of each of $R_7$ and $R_8$ in the above general formula (1) may be substituted by an alkyl group such as a methyl group and an ethyl group, a phenyl group, a methoxyphenyl group, an ethoxyphenyl group or a benzenesulfonic acid group.

$R_9$ and $R_{10}$ in the above general formula (1) correspond to a substitution residue group of an amine represented by general formula (3) below that is to be used in a reaction with a sulfonyl halide compound that is a precursor of a colorant compound represented by the above general formula (1).

General formula (3)

wherein each of $R_9$ and $R_{10}$ independently denotes a hydrogen atom, an alkyl group, an aryl group or an aralkyl group and may form a heterocycle with a nitrogen atom.

Since $R_9$ and $R_{10}$ in the above general formula (3) significantly influence the solubility of a colorant compound represented by the general formula (1), it is possible to obtain a colorant compound showing a desired level of solubility by changing the substituent of each of $R_9$ and $R_{10}$.

Examples of substituents that can be used for each of $R_9$ and $R_{10}$ include chain or cyclic alkyl groups such as a methyl group, an ethyl group, an n-propyl group, an isopropyl group, an n-butyl group, a sec-butyl group, a tert-butyl group, an n-pentyl group, an n-hexyl group, an n-pentyl group, an octyl group, a 2-ethylhexyl group and a cyclohexyl group as well as aryl groups such as a phenyl group, a 1-naphthyl group and a 2-naphthyl group and aralkyl groups such as a benzyl group and a phenethyl group.

Each of $R_9$ and $R_{10}$ may form a heterocycle with a nitrogen atom. Specific examples of such heterocyclic groups include a piperidino group, a piperazino group, a pyrrole group, an indol group, a carbazole group, a pyrazole group, an indazole group, an imidazole group, a benzimidazole group, a triazole group, a benzotriazole group and a tetrazole group. From the viewpoint of reactivity for sulfonamidation, it is preferable that the substituent of each of $R_9$ and $R_{10}$ shows a small steric hindrance because the reactivity of the general formula (5) shown below is high when such a substituent is used and a colorant compound represented by the general formula (1) can be produced at a high yield. From the viewpoint of solubility for organic solvents, it is preferable that each of $R_9$ and $R_{10}$ is a long chain alkyl group or the like that is highly oil-soluble.

As described above, a colorant compound represented by the above general formula (1) is characterized by water-insolubility. The expression of water-insolubility as used herein refers to a solubility in distilled water that is not higher than 0.1 mass % at 20° C. However, note that colorant compounds that can be used for a coloring liquid according to the present invention are not limited to the above described ones.

Now, a method of manufacturing a colorant compound that can be used for the purpose of the present invention will be described below. The method of manufacturing a colorant compound as defined above comprises a step of obtaining a sulfonyl halide having a structure represented by the general formula (5) as mentioned above by halogenization of a sulfonic acid group in a colorant compound represented by the general formula (4) below and a step of subsequently obtaining a colorant compound represented by the above general formula (1) by causing a condensation reaction to take place between the sulfonyl halide compound and an amine having a structure represented by the above general formula (3).

General formula (4)

wherein.

each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or —$SO_3M$. Additionally, in the general formula (4), n denotes an integer between 1 and 3. If neither $R_7$ nor $R_8$ is —$SO_3M$, at least one of the $R_1$ through $R_4$ is an alkylene group, an arylene group or an aralkylene group having —$SO_3M$ as a substituent. In the general formula (4), M denotes a counter cation of a sulfonic acid group and An represents a counter anion, although An is not necessary when a counter anion exists in the molecule.

General formula (5)

wherein
each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or —$SO_3X$. Additionally, in the general formula (5), n denotes an integer between 1 and 3. If neither $R_7$ nor $R_8$ is —$SO_3X$, at least one of the $R_1$ through $R_4$ is an alkylene group, an arylene group or an aralkylene group having —$SO_3X$ as a substituent. In the general formula (5), X denotes a halogen atom and An denotes a counter anion, although An is not necessary when a counter anion exists in the molecule.

Specific examples of M in the general formula (4) include a hydrogen atom and a metal ion such as a sodium ion, a lithium ion and a potassium ion. Specific examples of X in the general formula (5) include halogen atoms such as a chlorine atom and a bromine atom.

Specific examples of colorant compounds having a structure represented by the general formula (4) non-limitatively include those having a structure represented by any of general formulas (6) through (9) listed below.

wherein M represents a counter cation of a sulfonic acid group as in the above general formula (4).

Any of the above colorant compounds is caused to react with a thionyl halide by itself or as a mixture of two or more than two such colorant compounds. Thionyl chloride is preferable among thionyl halides. The use of a solvent of a halogenated aliphatic hydrocarbon compound is preferable for the purpose of the present invention. Specific examples of halogenated aliphatic hydrocarbons include chloroform, methylene chloride, carbon tetrachloride, 1,2-dichloroethane, dichloroethylene, trichloroethylene, perchloroethylene, dichloropropane, amyl chloride, dichloropentane, tetrachloroethane and 1,2-dibromoethane, of which chloroform is preferable.

In the reaction of a colorant compound represented by the general formula (4) with thionyl halide, the amount ratio of thionyl halide (A) relative to N,N-dimethylformamide (B), or A:B, is preferably within a range between 1:0.3 and 1:0.8. While the amount of thionyl halide (A) varies depending on the type and the purity of the colorant compound (C) to be used, the amount ratio of thionyl halide (A) relative to the colorant compound (C) to be used, or A:C, is normally within a range between 1:1 and 1:20. Generally speaking, the amount of thionyl halide to be used may be stoichiometrically equivalent or slightly excessive when the colorant compound shows a high degree of purity. On the other hand, thionyl halide is preferably used in an amount that is stoichiometrically much excessive when the colorant compound shows a low colorant purity because it contains impurities such as common salt and/or mirabilite to a large extent. The reaction is normally conducted by gradually dropping thionyl halide into a mixture of a colorant compound of the general formula (4), N,N-dimethylformamide and a solvent of a halogenated aliphatic hydrocarbon compound. The reaction temperature is normally between about 0° C. and about 70° C., preferably between about 30° and 60° C., and the reaction time is normally between 30 minutes and 6 hours. The amount of a halogenated aliphatic hydrocarbon compound is used may be selected appropriately.

The sulfonyl halide compound represented by the general formula (5) is normally taken out form the reaction mixture by means of a conventional technique including extraction, washing and condensation, if necessary after cooling the reaction mixture, after decomposing the remaining thionyl halide by pouring the mixture into water or ice water. Preferably, the obtained reaction mixture (the solvent solution of a halogenized aliphatic hydrocarbon compound containing the sulfonyl halide compound and the remaining thionyl halide) is subjected to the condensation reaction with the amine represented by the above general formula (3) without further treatment.

The condensation reaction of the sulfonyl halide compound represented by the general formula (4) and the amine represented by the general formula (3) is conducted preferably in the presence of a basic catalyst, which may typically be an aliphatic or aromatic amine. Specific examples of aliphatic or aromatic amines that can be used as a basic catalyst for the condensation reaction include triethylamine, pyridine, piperidine, piperazine and triethanolamine. The use of a tertiary amine is preferable. When the reaction mixture is subjected to a reaction with the amine represented by the general formula (3) without further treatment and a basic catalyst is used, the molar ratio of the total amount (D) of the amine represented by the general formula (3) and the above described basic catalyst relative to the amount (A) of thionyl halide to be used in the above reaction, or D:A, is preferably within a range between 1:2.2 and 1:2.5.

When a basic catalyst is used, the molar ratio of the catalyst (E) relative to the amine (F) represented by the general formula (3), or E:F, is within a range between 1:0.5 and 1:1.5, preferably between 1:0.8 and 1:1.2. The amount of the condensation reaction solvent such as a halogenated aliphatic hydrocarbon compound to be used may be selected appropriately. The condensation reaction temperature is normally between 0° C. and 60° C., preferably between 5° C. and 40° C., and the reaction time is normally between 30 minutes and 6 hours. The colorant compound represented by the general formula (1) is normally taken out from the condensation reaction mixture by means of a conventional technique including neutralization, extraction, washing and condensation, if necessary after cooling the reaction mixture. Preferably, a technique of condensing the solvent and refining it by recrystallization or by means of column chromatography after the neutralization, the extraction and the washing may be used.

Now, a method of manufacturing a coloring liquid according to the present invention and containing a colorant compound represented by the above general formula (1) will be described below. For the purpose of the present invention, a coloring liquid generally refers to a solution that may contain a colored compound such as a colorant, a dye, a pigment and a stain that can be generally used in various fields of industry. A coloring liquid according to the invention may contain any appropriate colorant compound so long as it matches the application of the coloring liquid. More specifically, while the content of the colorant compound in a coloring liquid according to the invention is determined depending on the type of each of the components of the solvent, the characteristics required to the coloring liquid and so on, it is generally within a range between 0.5 and 15 mass %, preferably between 1 and 7 mass %, relative to the total weight of the coloring liquid.

Coloring liquids to be used for ink-jet recording systems include both aqueous inks and oily inks. Depending on the composition, aqueous inks can be categorized into the type to dissolve a colorant compound that is water-soluble and the type to disperse a colorant compound that is hardly soluble in water. On the other hand, depending on the composition, oily inks can be categorized into the type to dissolve a colorant compound in an oily solvent, the type to melt a colorant compound by heat and the type to disperse a colorant compound (pigment) that is hardly soluble in oily solvents. A colorant compound represented by the above general formula (1) is hardly soluble in aqueous solvents and soluble in oily solvents.

[Aqueous Inks]

A coloring liquid according to the invention can be prepared in a regulated manner by dispersing a colorant compound as defined by the above general formula (1) in a medium that contains an aqueous medium as principal ingredient. The aqueous medium may be water or a mixture solvent containing mainly water and a water-soluble organic solvent.

Examples of water-soluble organic solvents that can be used for the purpose of the present invention include: alcohols such as methanol, ethanol, propanol, isopropanol, butanol, isobutanol, sec-butanol, t-butanol, pentanol, hexanol, cyclohexanol and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether; amines such as ethanol amine, diethanol amine, triethanol amine, N-methyldiethanolamine, N-ethyldiethanolamine, morpholine, N-ethylmorpholine, ethylene diamine, diethylene triamine, triethylene tetraamine, polyethylene imine and tetramethyl propylene diamine; polar solvents such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. Two or more than two water-soluble organic solvents may be used in combination with water. It is preferable to use not ordinary water that contains various ions but deionized water.

Of the above listed organic solvents, glycerin, diethylene glycol, polyethylene glycol and propylene glycol are preferable from the viewpoint of moisture keeping effect. Any of these organic solvents may be used alone or in combination of two or more of them.

Preferably, a colorant compound as defined by the above general formula (1) is dispersed in a mixed solvent of water and the water-soluble organic solvents by means of a dispersant. Alternatively, a colorant may be dissolved in an oily organic solvent and subsequently dispersed in a mixed solvent by means of an appropriate dispersant. However, it is preferable that substantially no oily organic solvent is contained (and hence the content of any oily organic solvent is substantially 0 mass %).

For the purpose of the present invention, it is preferable that no oily organic solvent is used (and hence the content of any oily organic solvent is substantially 0 mass %). However, an oily organic solvent may be used along with water so long as the use of such a solvent does not adversely affect a coloring liquid according to the present invention.

Any oily organic solvent may be used for the purpose of the present invention so long as it dissolves a colorant compound as defined by the above general formula (1) and a dispersant that is used as needed to produce a coloring liquid that shows a good dispersion stability. Specific examples of oily organic solvents that can preferably be used for the purpose of the present invention include dimethyl sulfoxide, dimethyl imidazolidinone, sulfolane, N-methylpyrrolidone, dimethyl formamide, acetonitrile, dioxane, tetramethyl urea, hexamethylphosphoramide, hexamethylphosphorotriamide, propionitrile, butanone, cyclohexanone, tetrahydrofuran, tetrahydropyran, ethylene glycol diacetate, γ-butyrolactone and styrene, of which tetrahydrofuran, cyclohexane and styrene are particularly preferable from the viewpoint of dissolving a colorant compound as defined by the above general formula (1).

The dispersant to be used for the purpose of the present invention is intended to reduce the colorant compound represented by the general formula (1) to micro-particles and stably disperse it in an aqueous medium. Any dispersant may be used for the purpose of the present invention so long as it is hydrophilic and can stably disperse the colorant compound in an aqueous medium. An anionic surface active agent, a nonionic surface active agent or a polymeric surface active agent may be used alone or in combination of two or more of them. From the viewpoint of dispersing a colorant compound as defined by the above general formula (1), the use of an anionic surface active agent or a nonionic surface active agent is preferable, although the use of an anionic surface active agent is particularly preferable.

Examples of anionic surface active agents that can be used for the purpose of the present invention include alkyl phenyl sulfonates, alkyl benzene sulfonates, alkyl phenyl sulfonates, alkyl naphthalene sulfonates, higher fatty acid salts, formalin condensates of naphthalene sulfonates, lignin sulfonates, formalin condensates of special aromatic sulfonates (formalin condensates of sodium alkylnaphthalene sulfonates such as sodium butyl and sodium naphthalene sulfonate, formalin condensate of sodium cresol sulfonate and 2-naphthol-6-sodium sulfonate, formalin condensate of sodium cresol sulfonate, formalin condensate of sodium creosote oil sulfonate and so on) and polyoxyethylene alkylether sulfonates.

Examples of nonionic surface active agents that can be used for the purpose of the present invention include polyoxyethylene solbitan fatty acid esters, polyoxyehtylene alkylethers, polyoxyehtylene alkylphenylethers, polyoxyethylene acetyleneglycols, polyoxyethylene derivatives, oxyethylene-oxypropylene block copolymers, polyoxyethylene nonylphenyl ethers, polyoxyethylne octylphenyl ethers, polyoxyethylene dodecylphenyl ethers, polyoxyethylene alkylethers, polyoxyethylene fatty acid esters, sorbitan fatty acid esters, polyoxyethylene sorbitan fatty acid esters, fatty acid alkylol amides, acetylene alcohol ethylene oxide adducts, polyethyleneglycol polypropyleneglycol block copolymers, polyoxyethylene ethers of glycerin esters and polyoxyethylene ethers of sorbitol esters.

Examples of polymeric surface active agents that can be used for the purpose of the present invention include partial alkyl esters of polyacrylic acids, polyalkylene polyamines, polyacrylates, styrene-acrylic acid copolymers and vinyl naphthalene-maleic acid copolymers. Examples of dispersants derived from natural products and those obtained by modifying natural products by means of an enzyme include proteins such as gelatin and casein, natural rubber such as gum acacia, glycoxides such as saponin, cellulose derivatives such as alkylcelluloses, carboxy alkylcelluloses and hydroxy alkylcelluloses, lignin sulfonates, natural polymers such as shellac and surface active agents for foods such as lecithin and enzyme decomposed lecithin.

The content of the dispersant in a coloring liquid according to the invention is preferably between 0.1 and 20 mass %, more preferably between 0.1 and 12 mass % relative to the total mass of the ink from the viewpoint of effectively maintaining the dispersion stability of the colorant compound. represented by the general formula (1) and contained in the coloring liquid.

Any technique may be used to disperse the colorant compound in the solvent so long as it does not adversely affect the purpose of the present invention. A dispersing apparatus such as a ball mill, a sand mill, an atoliter, a roll mill, an agitator mill, an impeller, a disperser, a Henschel mixer, a colloid mill, an ultrasonic homogenizer, a pearl mill, a jet mill, an ong mill, a KD mill, a triple-roll mill or a pressure kneader may be used to disperse the colorant compound in the solvent. An aqueous ink according to the invention can be used as ink-jet recording ink.

[Oily inks]

An oily ink according to the invention can be prepared in a regulated manner by dispersing a colorant compound as defined by the above general formula (1) in a medium that contains an oily medium that is liquid or solid at room temperature as a principal ingredient. Examples of oily mediums (oily organic solvents) that is liquid at room temperature include: alcohols such as ethanol, pentanol, heptanol, octanol, cyclohexanol, benzyl alcohol, phenyl ethyl alcohol, phenyl propyl alcohol, furfuryl alcohol and anise alcohol, glycol derivatives such as ethylene glycol monoethyl ether, ethylene glycol monophenyl ether, diethylene glycol monoethyl ether, diethylene glycol monobutyl ether, propylene glycol monoethyl ether, propylene glycol monophenyl ether, dipropylene glycol monomethyl ether, dipropylene glycol monoethyl ether triethylene glycol monomethyl ether, ethylene glycol diacetate, etheylene glycol monoethyl ether acetate and propylene glycol diacetate; ketones such as benzyl methyl ketone, diacetone alcohol and cyclohexanone; ethers such as butyl phenyl ether, benzyl ethyl ether and hexyl ether; esters such as ethyl acetate, amyl acetate, benzyl acetate, phenyl ethyl acetate, phenoxy ethyl acetate, ethyl phenyl acetate, benzyl propionate, ethyl benzoate, butyl benzoate, ethyl laurate, butyl laurate, isopropyl myristate, isopropyl palmitate, triethyl phosphate, tributyl phosphate, diethyl phthalate, dibutyl phthalate, diethyl malonate, dipropyl malonate, diethyl malonate diethyl, diethyl succinate, dibutyl succinate, diethyl glutarate, diethyl adipate, dibutyl adipate, di(2-methoxyethyl)adipate, diethyl sebacate, diethyl maleate, dibutyl maleate, dioctyl maleate, diethyl fumarate, dioctyl fumarate and 3-hexenyl cinnamate; hydrocarbon type solvents such as petroleum ether, petroleum benzyl, tetralin, delicane, 1-amyl benzene and dimethyl naphthalene; and polar solvents such as acetonitrile, formamide, N,N-dimethyl formamide, N,N-dimethyl acetoamide, dimethyl sulfoxide, sulfolane, propylene carbonate, N-methyl-2-pyrrolidone, N-vinyl-2-pyrrolidone and N,N-diethyldodecane amide. From the viewpoint of solubility of a colorant compound as defined by the above general formula (1), the use of tetrahydrofuran, cyclohexanone or styrene is preferable. Any of these organic solvents may be used alone or in combination of two or more of them.

When an oily medium that is solid at room temperature is used as a medium for an oily ink according to the present invention, it is a solid ink. Then, such an oily ink according to the invention can be prepared in a regulated manner by dissolving or dispersing a colorant compound as defined by the above general formula (1) in a phase change solvent that is solid at room temperature but becomes molten and turned to liquid when heated. Examples of phase change solvents that can be used for the purpose of the present invention include natural waxes such as beeswax, carnauba wax, rice wax, Japan wax, jojoba oil, whale wax, candelilla wax, lanoline, montan wax, ozokerite, ceresin, paraffin wax, microclystalline wax and petrolactum; organic acids such as Polyethylene wax, chlorinated hydrocarbons, palmitic acid, stearic acid, behenic acid, tiglic acid, 2-acetonaphto behenic acid, 12-hydroxy stearic acid and dihydroxy stearic acid; alcohols such as dodecanol, tetradecanol, hexadecanol, eicosanol, docosanol, tetracosanol, hexacosanol, octacosanol, dodecenol, myricyl alcohol, tetracenol, hexadecenol, eicosenol, docosenol, pinene glycol, hinokitiol, butynediol, nonandiol, isophthalyl alcohol; mesiserine, hexanediol, decanediol, tetradecanediol, hexadecanediol, docosandiol, tetracosandiol, terpineol, phenyl glycerin, eicosanediol, octanediol and phenylpropylene glycol; phenols such as bisphenol A, p-α-cumylphenol; esters of any of the above listed organic acids and glycerin, ethylene glycol, diethylene glycol and so on; esters of cholesterol fatty acids such as cholesterol stearate, cholesterol palmitate, cholesterol myristate, cholesterol behenate, cholesterol laurate and cholesterol melissate; esters of saccharoidal fatty acids such as saccharose stearate, saccharose palmitate, saccharose behenate, saccharose laurate, saccharose melissate, lactose stearate, lactose palmitate, lactose behenate, lactose laurate and lactose melissate; ketones such as benzoylacetone, diacetobenzene, benzophenone, tricosanon, heptacosanone, heptatriacontanone, hentriancotanone, stearone and laurone, amides such as amide oleate, amide laurate, amide stearate, amide recinoleate, amide palmitate, amide tetrahydrofurate, amide erucate, amide mysitate, amide 12-hydroxy stearate, amide N-stearylerucate, amide N-oleylstearate, amide N,N-ethylenebislaurate, amide N,N-ethylenebisstearate, amide N,N-ethylenebisbehenate, amide N,N-xylenebisstearate, amide N,N-butylenebisstearate, amide N,N-dioleyladipate, amide N,N-dioleylsebacate, amide N,N-distearylsebacate, amide N,N-dostearylterephthalate, phenacetin, toluamide and acetoamide; and sulfonamides such as p-toluensulfonamide, ethylbenzenesulfonamide and butylbenzenesulfonamide.

The phase-changing temperature of the phase change solvent from solid to liquid is preferably between 60° C. and 200° C., more preferably between 80 and 150° C. The solid ink may be prepared by dissolving a colorant compound as defined by the above general formula (1) in the phase change solvent that is molten by heating or by dispersing or dissolving it with an appropriate dispersant and/or an appropriate coupling agent. The dispersant is made to be contained by 0.5 to 20 mass % relative to the total mass of the coloring liquid according to the invention.

An oily ink according to the present invention can be used as ink-jet recording ink. Particularly, when the oily solvent is solid at room temperature, the oily ink can be used as an ink composition for use in a so-called hot-melt type (or wax-jet type) ink-jet recording apparatus.

A coloring liquid according to the invention can suitably be used as ink-jet recording ink. Then, if necessary, the coloring liquid may be made to contain various additives such as viscosity adjusting agents, surface tension adjusting agents, pH adjusting agents, defoaming agents, antiseptic agents, fungicidal agents and so on in addition to the above described ingredients in order to have it show desired physical properties.

While a coloring liquid according to the present invention is particularly suitable for use in ink-jet recording systems that are adapted to record images by applying energy to the coloring liquid and ejecting it so as to cause it to adhere to a recording medium, it can be used for any applications of a coloring liquid. Examples of possible applications of a coloring liquid according to the invention include printing inks, paints, cosmetics, ball point pen inks, marker inks and inks for recording materials such as ink sheets for thermal fusion transfer or thermal sublimation transfer where ink is applied to a base member typically made of cloth or plastic film or a base member impregnated with ink is used. Additionally, a coloring liquid according to the present invention can be applied to various recording materials of the recording layers of optical recording mediums.

Now, a recording apparatus according to the present invention will be described below. A recording apparatus that can suitably be operated with ink according to the present invention typically comprises a recording head having an ink storing portion for storing ink so that thermal or mechanical energy is applied to the ink contained in a chamber of the recording head to produce liquid droplets of ink by means of the applied energy.

Figure 1:
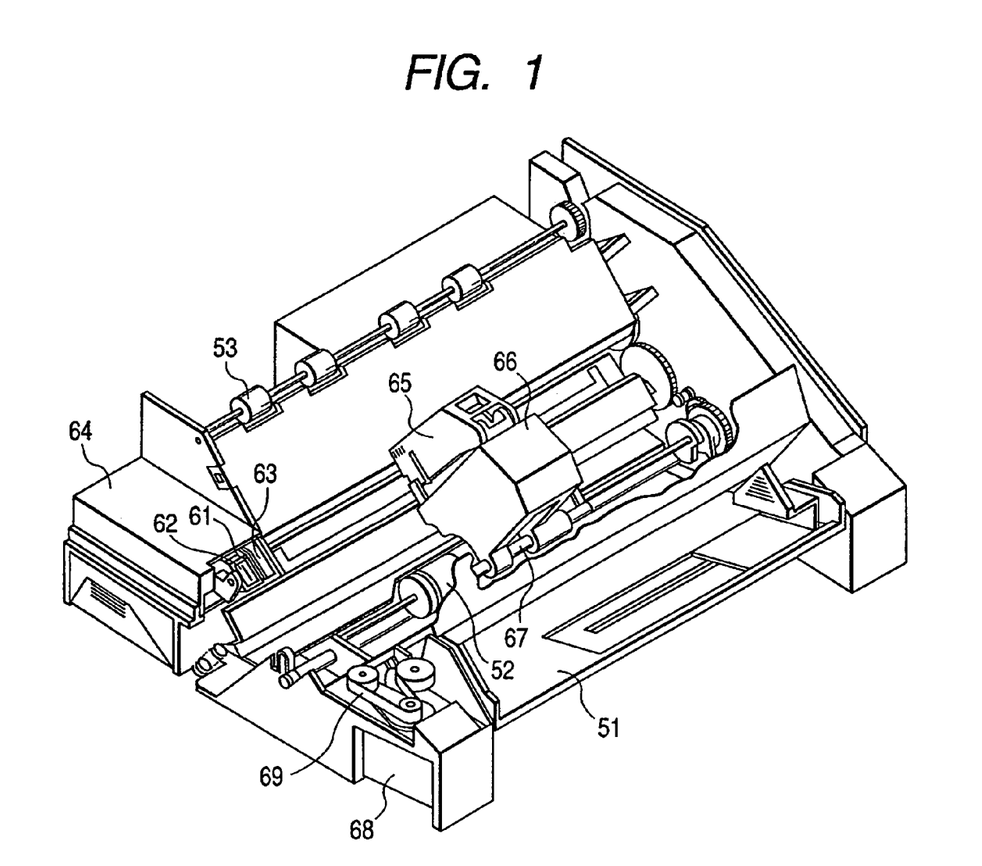
FIG. 1 is a schematic perspective view of an ink-jet recording apparatus.

FIG. 1 schematically illustrates an ink-jet recording apparatus equipped with such a head. Referring to FIG. 1, the apparatus comprises a blade 61 that is a wiping member held by a blade holding member at one of the opposite ends thereof, which is a fixed end, so that it operates like a cantilever. The blade 61 is arranged at a position adjacent to the recording region of the recording head and, in the instance of FIG. 1, held in a state where it projects into the moving path of the recording head. In FIG. 1, reference symbol 62 denotes a cap that is arranged at a home position located adjacent to the blade 1 and adapted to move in a direction perpendicular to the moving direction of the recording head and abut the ejection surface of the recording head so as to operate as a cap. Reference symbol 63 in FIG. 1 denotes an ink absorbing body arranged at apposition adjacent to the blade 61. Like the blade 61, it is held in a state where it projects into the moving path of the recording head.

The blade 61, the cap 62 and the absorbing body 63 constitute an ejection recovery section 64. The blade 61 and the absorbing body 63 cooperate with each other to remove the moisture, the dirt and the dust on the ink ejection surface where ejection orifices are arranged. Reference symbol 65 denotes the recording head that has an ejection energy generating means so as to eject ink onto the recording medium placed vis-à-vis the ejection surface where the ejection orifices are arranged and reference symbol 66 denotes a carriage that is mounted with the recording head 65 so as to move the recording head 65 with it. The carriage 66 is slidably engaged with a guide shaft 67 and a part of the carriage 66 is connected to a belt 69 that is driven by a motor 68. With this arrangement, the carriage 66 can move along the guide shaft 67 and hence the recording head 65 can move in the recording region and adjacent regions.

In FIG. 1, reference symbol 51 denotes a paper feed section for feeding a recording medium and reference symbol 52 denotes a paper feed roller that is driven by a motor (not shown). By means of these components, a recording medium is fed to a position located vis-à-vis the ejection surface of the recording head where the ejection orifices are arranged and then delivered to a paper delivery section that is provided with a delivery roller 53.

With the above-described arrangement, when the recording head 65 is returned to the home position probably because a recording operation is over, the cap 62 of the ejection recovery section 64 is retracted from the moving path of the recording head 65 but the blade 61 remains unmoved and keeps on projecting into the moving path. Thus, as a result, the ejection surface of the recording head 65 is wiped by the blade 61. When the cap 62 is made to abut the ejection surface of the recording head 65 where the ejection orifices are arranged so as to cover the latter, it moves and projects into the moving path of the recording head.

At the time when the recording head 65 moves from the home position to the recording start position, the cap 62 and the blade 61 are located at respective positions that are the same as those where they are located at the time of a wiping operation. As a result, the ejection surface of the recording head 65 where the ejection orifices are arranged is also wiped during this movement. The recording head moves to the home position that is adjacent to the recording region not only at the time when a recording operation is over and at the time of an ejection recovery operation but also repeatedly with predetermined time intervals even when it is moving to the recording region for a recording operation. Then, the ejection surface where the ejection orifices are arranged is wiped each time the recording head moves to the home position.

Figure 2:
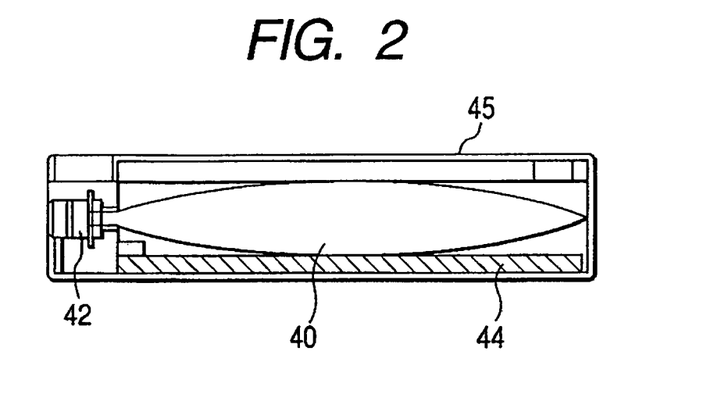
FIG. 2 is a schematic longitudinal cross sectional view of an ink cartridge.

FIG. 2 is a schematic longitudinal cross sectional view of an ink cartridge 45 that contains ink to be supplied to the recording head by way of an ink supply member, which may typically be a tube. In FIG. 2, reference symbol 40 denotes an ink storing portion that contains ink to be supplied. It may typically be an ink bag that is provided with a rubber peg 42 at the front end thereof. Ink can be supplied to the recording head from the ink bag 40 as a needle (not shown) is pierced through the peg 42. In FIG. 2, reference symbol 44 denotes an ink absorbing body for receiving waste ink.

Figure 3:
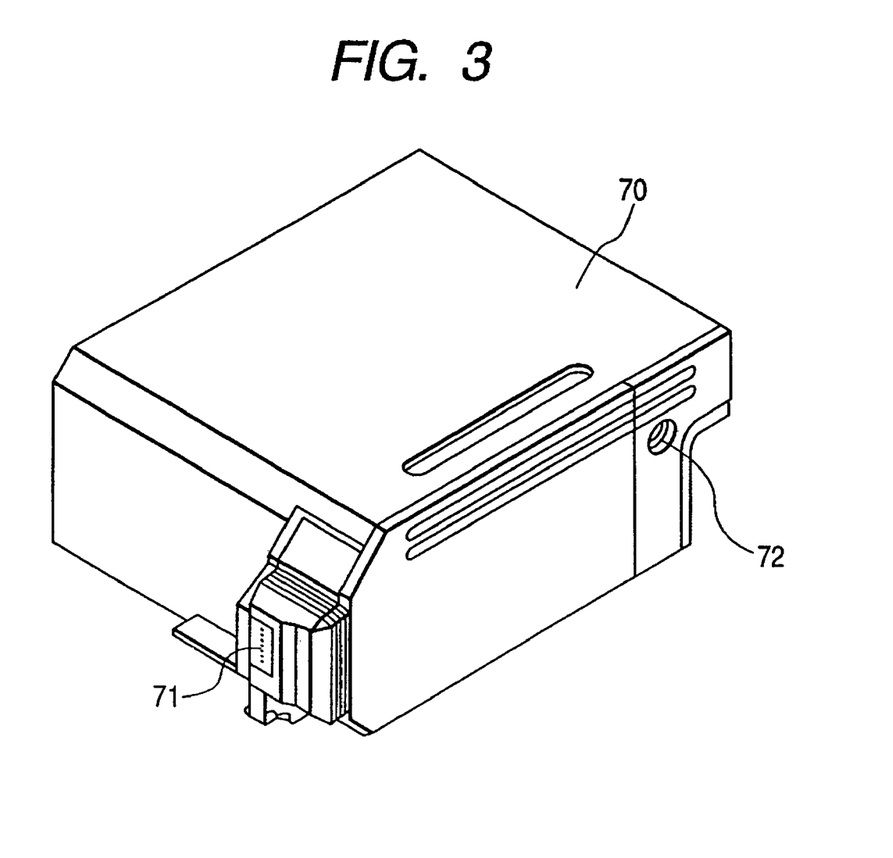
FIG. 3 is a schematic perspective view of a recording unit.

The recording head and the ink carriage may not necessarily be arranged separately as described above in an ink-jet recording apparatus according to the present invention. FIG. 3 is a schematic perspective view of a recording unit that can be used for an ink-jet recording apparatus according to the invention and is realized by integrally combining a recording head and an ink carriage. Referring to FIG. 3, reference symbol 70 denotes a recording unit that contains an ink storing portion storing ink, which may be an ink absorbing body, from which ink is supplied to a head section 71 having a plurality of orifices so that ink is ejected through the orifices as ink droplets. In FIG. 3, reference symbol 72 denotes an atmosphere communication port for allowing the inside of the recording unit to communicate with the atmosphere. The recording unit 70 can replace the recording head 65 illustrated in FIG. 1. It can be removably fitted to the carriage 66.

Figure 4:
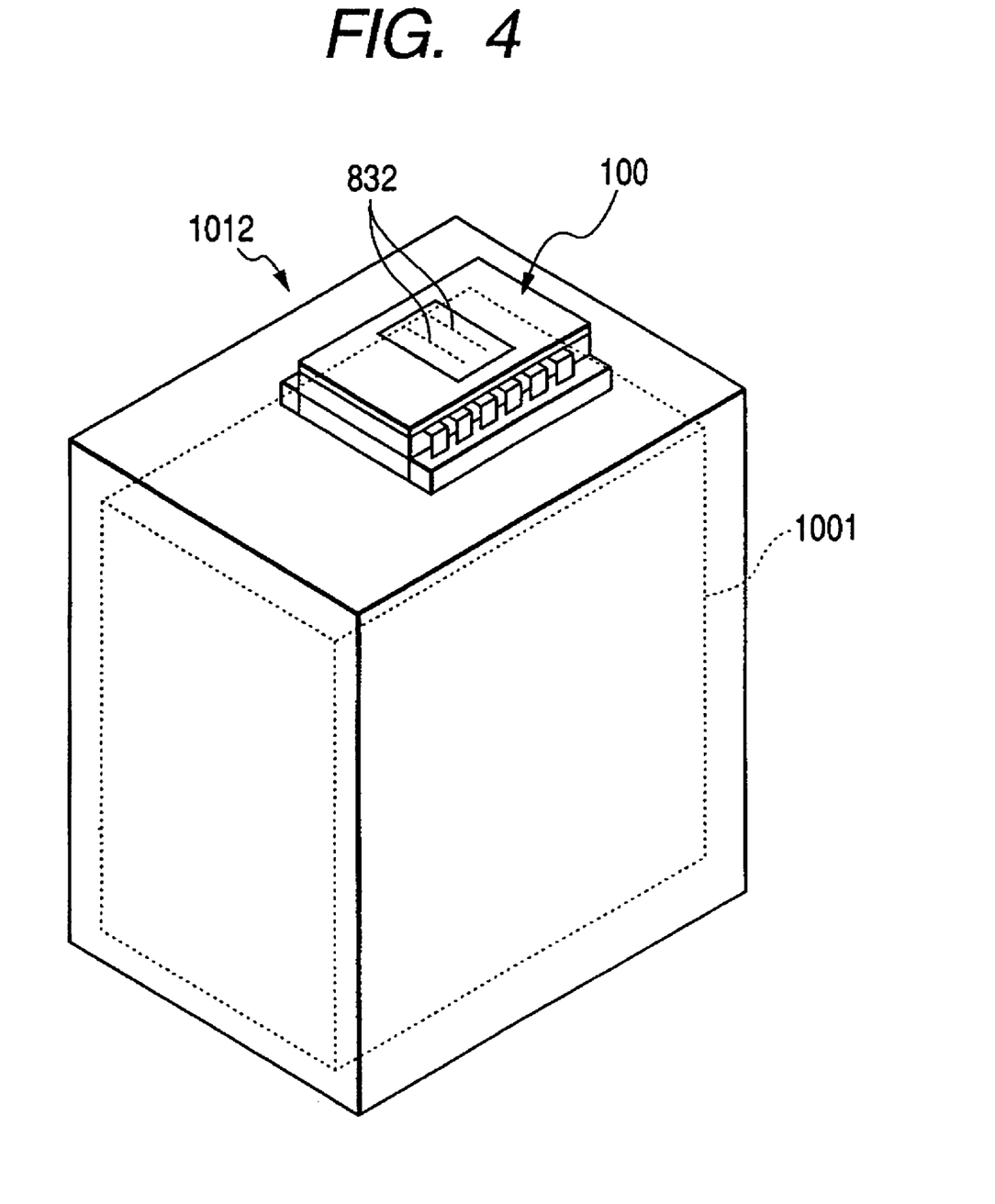
FIG. 4 is a schematic perspective view of an ink-jet cartridge having a liquid ejection head.

FIG. 4 is a schematic perspective view of an ink-jet cartridge that can be mounted into an ink-jet recording apparatus according to the present invention. A carriage 1012 is of a serial type and comprises an ink-jet recording head 100 and a liquid tank 1001 for containing liquid, which may typically be ink, as principal components thereof. The ink-jet recording head 100 is provided with a large number of ejection orifices 832 for ejecting liquid. Thus, liquid, which may typically be ink, is led from the liquid tank 1001 to a common liquid chamber in the liquid ejection head 100 by way of a liquid supply path (not shown). The carriage 1012 illustrated in FIG. 4 is realized by integrally forming an ink-jet recording head 100 and a liquid tank 1001 so that liquid maybe supplied into the liquid tank 1001 whenever necessary. However, alternatively, the liquid tank 1001 may be replaceably linked to the liquid ejection head 100 for the purpose of the present invention.

EXAMPLES

Now, the present invention will be described further by way of examples and comparative examples, although the present invention is by no means limited to the examples. In the following description, "parts" and "%" are parts by mass and mass % unless noted otherwise.

Synthesis Example (Manufacturing a Colorant Compound as Defined by General Formula (10) Shown Below)

5.1 mL of thionyl chloride was dropped into a mixture of 10 g of a colorant compound represented by the above general formula (6), where M is sodium salt, 80 mL of chloroform and 2.4 g of N,N-dimethylformamide, over one hour, at room temperature. After completing the dropping, the temperature of the solution was raised to 60° C. and stirred for 3 hours at this temperature. Then, a mixture of 15.5 g of di(2-ethylhexyl)amine and 7.7 g of triethylamine was dropped into the obtained reaction mixture, over one hour at 0° C. After completing the dropping, the temperature of the solution was raised to 60° C. and stirred for 3 hour at this temperature. After the completion of the reaction, the reaction mixture was neutralized by acetic acid and poured into 250 mL of water. Then, the reaction mixture was subjected to an extraction process by using chloroform and the organic layer was washed twice with 250 mL of water. After drying the organic layer by means of anhydrous mirabilite, the precipitate was filtered and the solvent in the filtration liquid was distilled off. Then, the distillation residue was refined by means of column chromatography to obtain a compound represented by the formula (10).

The structure of the compound was identified by means $_1$H and $_{13}$C NMR analysis, using a nuclear magnetic resonance. spectrochemical analyzer (ECA-400: tradename, available from JEOL), and the purity of the obtained compound was checked by means of HPLC (high performance liquid chromatography, LC2010A: tradename, available from SHIMADZU). The results of the analysis are shown below.

[Results of Analysis of Compound Represented by Formula (10)]

Figure 5:
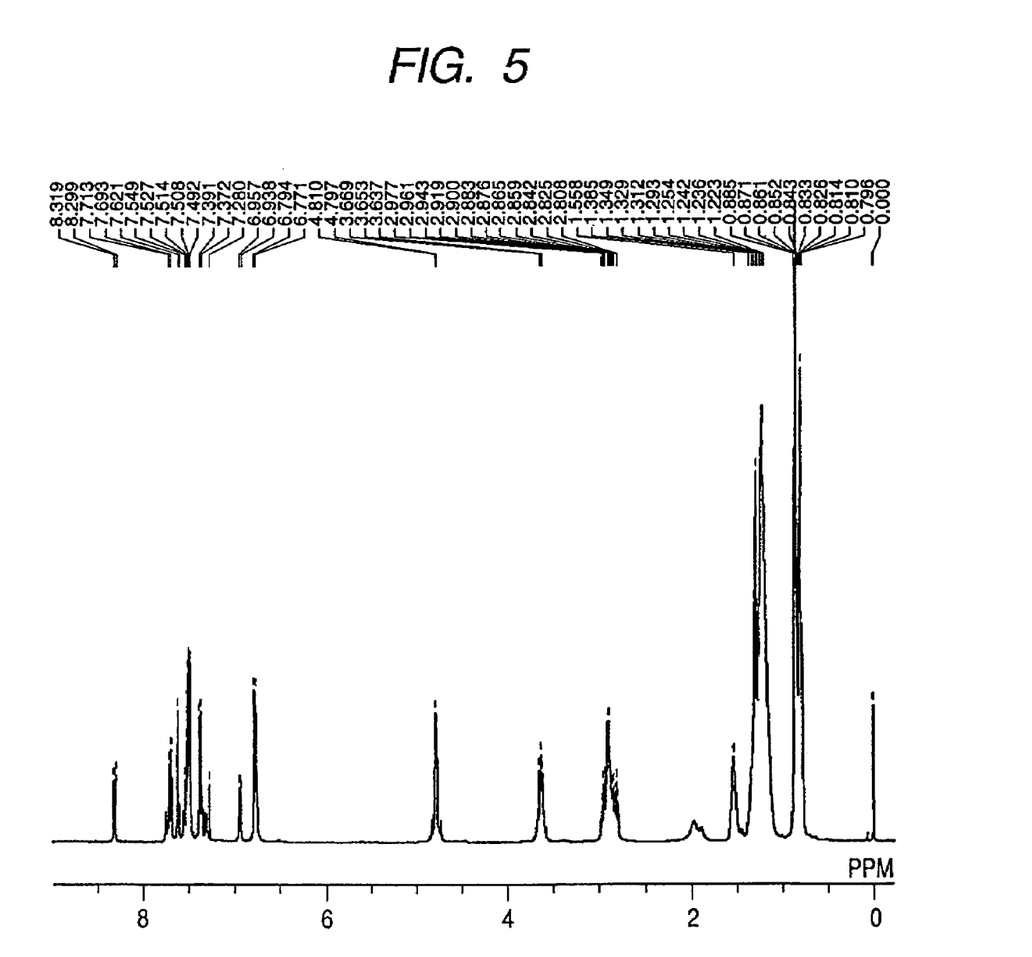
FIG. 5 is a $_1$H NMR spectrum (400 MHz, CDCl$_3$, room temperature) of a colorant compound (10) according to the present invention.

[1] results of $_1$H NMR (400 MHz, CDCl$_3$, room temperature) (FIG. 5):

δ=0.80-0.89 (m, 24H), 1.22-1.39 (m, 42H), 2.81-3.00 (m, 8H), 3.60-3.70 (m, 4H), 4.75-4.85 (m, 4H), 6.77-6.79 (m, 4H), 6.95 (dd, 1H), 7.32 (d, 1H), 7.38 (m, 2H), 7.49-7.57 (m, 7H), 7.62 (br, 2H), 7.69-7.75 (m, 2H), 8.31 (d, 1H)

[2] results of $_{13}$C NMR (100 MHz, CDC$_{13}$, room temperature):

δ=10.1, 12.5, 14.0, 23.0, 23.4, 28.6, 30.3, 37.7, 46.6, 53.4, 113.2, 125.2, 126.6, 126.8, 128.0, 128.7, 129.1, 130.0, 130.1, 130.3, 130.4, 136.2, 137.0, 140.4, 141.7, 147.4, 156.1, 182.1

[3] results of HPLC: purity=96.7 area %, retention time: 9.3 minutes (MeOH/H$_2$O=95/5)

<Coloring Liquid Preparation Method 1>

Example 1

A mixture of 20 parts of the colorant compound represented by the above formula (10) and obtained by the above described manufacturing method, 12 parts of DEMOL N (tradename, available from Kao Corporation), which was Formula (10)

used as a dispersant, and 128 parts of ion exchange water was stirred with 330 parts of zirconia beads (available from NIKKATO CORPORATION) having a diameter of 0.5 mm in a paint shaker (available from Toyo Seiki Seisaku-sho, Ltd.) for 18 hours to obtain a coloring dispersion liquid with a solid concentration of 12.5%.

Then, an aqueous ink was prepared by adding 5 parts of Acetylenol (tradename, available from Kawaken Fine Chemicals Co., Ltd.), 50 parts of ethylene glycol and 50 parts of glycerin to the liquid and subsequently adding ion exchange water to regulate the colorant concentration to 2%.

Example 2

The process of Example 1 was followed in this example to prepare an aqueous ink except that the colorant compound represented by the formula (10) and used in Example 1 was replaced by a colorant compound represented by formula (11) below that is included in the definition of the above general formula (1).

<Coloring Liquid Preparation Method 2>

Example 4

An oily ink was prepared by adding 2 parts of the colorant compound represented by the formula (10) and used in Example 1 to a 1-to-1 mixture of tetrahydrofuran and cyclohexanone, stirring the mixture sufficiently until the colorant compound is dissolved and regulating the colorant concentration to 2%.

Example 5

The process of Example 4 was followed in this example to prepare an oily ink except that the colorant compound represented by the formula (10) and used in Example 4 was Formula (11)

Example 3

The process of Example 1 was followed in this example to prepare an aqueous ink except that the colorant compound represented by the formula (10) and used in Example 1 was replaced by a colorant compound represented by formula (12) below that is covered by the definition of the above general formula (1).

replaced by a colorant compound represented by the formula (11) above that is covered by the definition of the above general formula (1).

Example 6

The process of Example 4 was followed in this example to prepare an oily ink except that the colorant compound represented by the formula (10) and used in Example 4 was Formula (12)

replaced by a colorant compound represented by the formula (12) above that is covered by the definition of the above general formula (1).

Comparative Example 1

An aqueous ink was prepared in this comparative example by adding 2 parts of C. I. Acid Blue 9, 0.05 parts of Acetylenol, 5 parts of ethylene glycol and 5 parts of glycerin to ion exchange water, stirring the mixture sufficiently to dissolve the ingredients and regulating the colorant concentration to 2%.

Comparative Example 2

The process of Example 1 was followed in this comparative example to prepare an aqueous ink except that the colorant compound represented by the formula (10) and used in Example 1 was replaced by C. I. Pigment Blue 15:3.

Comparative Example 3

The process of Example 4 was followed in this comparative example to prepare an oily ink except that the colorant compound represented by the formula (10) and used in Example 4 was replaced by C. I. Solvent Blue 55.

<Evaluation>

Each of the aqueous inks obtained in Examples 1 through 3 and Comparative Examples 1 and 2 was filled in an ink cartridge of Bubble Jet (tradename) Printer Pixus 950i (available from Canon) and recorded products were prepared by forming a 2 cm square solid-printed image on a sheet of glossy professional photo paper (PR-101 Paper: tradename, available from Canon) and also on a sheet of plain paper PPC (NSK) (tradename, available from Canon) by means of the ink-jet printer. The obtained recorded products were dried in ambient air for 24 hours.

Additionally, each of the oily inks obtained in Examples 4 through 6 and the Comparative Example 3 was applied to a sheet of glossy professional photo paper (PR-101 Paper: tradename, available from Canon) by means of a bar coater (No. 3). The obtained recorded products were dried in ambient air for 24 hours.

(Saturation)

Each of the recorded products of the photo paper was observed for the optical density and the chromaticity (a*, b*) in the L*a*b* colorimetric system by means of a reflection densitometer called Spectrolino (tradename, available from Gretag Macbeth). The saturation of each of the recorded products was computationally determined by means of the formula shown below on the basis of the observed values for the color characteristics.

$$\text{saturation } (c^*) = \{(a^*)^2 + (b^*)^2\}^{(1/2)}$$

Recorded products showing a degree of saturation of not lower than 50 is regarded to be a high quantity recorded product.

(Water Fastness)

Each of the recorded products of plain paper was rigidly secured to an inclined plate showing an angle of inclination of 45 degrees and 1 mL of water was dropped onto the recorded product by means of a dropper. Then, the recorded product was left in this condition for 2 hours. After that, the blur of the image of the recorded product was observed and evaluated by referring to the ranking system shown below.

A: Water that flowed left no trace.
B: Water that flowed left a colored part as trace.

Table 1 shows the obtained results along with the types of the colorants used in the inks and the type of each of the inks.

TABLE 1

| | Principal Ingredients of Inks and the Results of Evaluation | | | |
|---|---|---|---|---|
| | colorant contained | type of ink | saturation | water fastness |
| Example 1 | formula (10) | aqueous | 63.5 | A |
| Example 2 | formula (11) | aqueous | 58.6 | A |
| Example 3 | formula (12) | aqueous | 52.4 | A |
| Example 4 | formula (10) | oily | 62.1 | — |
| Example 5 | formula (11) | oily | 56.4 | — |
| Example 6 | formula (12) | oily | 51.3 | — |
| Comparative Example 1 | C.I. Acid Blue 9 | aqueous | 62.6 | B |
| Comparative Example 2 | C.I. Pigment Blue 15:3 | aqueous | 46.5 | A |
| Comparative Example 3 | C.I. Solvent Blue 55 | oily | 48.2 | — |

The following was confirmed from the results of evaluation shown in Table 1. As for aqueous inks, images obtained by using an ink containing the colorant compound represented by the formula (10), the formula (11) or the formula (12) that is covered by the general formula (1) were found to be excellent in terms of both saturation and water fastness by comparing the inks of Example 1, Example 2 and Example 3 and those of Comparative Example 1 and Comparative Example 2.

As for oily inks, images obtained by using an ink containing the colorant compound represented by the formula (10), the formula (11) or the formula (12) that is covered by the general formula (1) were found to be excellent in terms of saturation by comparing the inks of Example 4, Example 5 and Example 6 and the ink of Comparative Example 3.

This application claims priority from a Japanese Patent Application-No. 2005-037415 filed Feb. 15, 2005, which is hereby incorporated by reference herein.

What is claimed is:

1. A coloring liquid comprising water and at least one colorant compound having a structure represented by the general formula (2) below:

General formula 2 where each of $R_9$ and $R_{10}$ independently denotes a hydrogen atom, an alkyl group, an aryl group or an aralkyl group and may form a heterocycle with a nitrogen atom.

2. A coloring liquid according to claim 1, further containing a dispersant.

3. A coloring liquid for use in an ink-jet recording system comprising a coloring liquid according to claim 1.

4. An ink tank comprising:

an ink storage portion; and a coloring liquid contained in the ink storage portion;

wherein said coloring liquid includes at least one colorant compound having a structure represented by the general formula (1) below:

General formula (1)

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or $-SO_2NR_9R_{10}$, wherein each of $R_9$ and $R_{10}$ independently denotes a hydrogen atom, an alkyl group, an aryl group or an aralkyl group and may form a heterocycle with a nitrogen atom; n denotes an integer between 1 and 3; if neither $R_7$ nor $R_8$ is $-SO_2NR_9R_{10}$, at least one of said $R_1$ through $R_4$ is an alkylene group, an arylene group or an aralkylene group having $-SO_2NR_9R_{10}$ as a substituent; and An denotes a counter anion, which is not necessary when a counter anion exists in the molecule.

5. A recording unit comprising:

an ink storage portion;

a coloring liquid; and a head section for ejecting droplets of the coloring liquid;

wherein said coloring liquid includes at least one colorant compound having a structure represented by the general formula (1) below:

General formula (1)

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or $-SO_2NR_9R_{10}$, wherein each of $R_9$ and $R_{10}$ independently denotes a hydrogen atom, an alkyl group, an aryl group or an aralkyl group and may form a heterocycle with a nitrogen atom; n denotes an integer between 1 and 3; if neither $R_7$ nor $R_8$ is $-SO_2NR_9R_{10}$, at least one of said $R_1$ through $R_4$ is an alkylene group, an arylene group or an aralkylene group having $-SO_2NR_9R_{10}$ as a substituent; and An denotes a counter anion, which is not necessary when a counter anion exists in the molecule.

6. An ink-jet recording apparatus comprising:

a coloring liquid; and an ink-jet recording head for ejecting the coloring liquid;

wherein said coloring liquid includes at least one colorant compound having a structure represented by the general formula (1) below:

General formula (1)

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or $-SO_2NR_9R_{10}$, wherein each of $R_9$ and $R_{10}$ independently denotes a hydrogen atom, an alkyl group, an aryl group or an aralkyl group and may form a heterocycle with a nitrogen atom; n denotes an integer between 1 and 3; if neither $R_7$ nor $R_8$ is $-SO_2NR_9R_{10}$, at least one of said $R_1$ through $R_4$ is an alkylene group, an arylene group or an aralkylene group having $-SO_2NR_9R_{10}$ as a substituent; and An denotes a counter anion, which is not necessary when a counter anion exists in the molecule.

7. An ink-jet recording method comprising:

ejecting a coloring liquid onto a recording medium by means of an ink-jet method;

wherein said coloring liquid includes at least one colorant compound having a structure represented by the general formula (1) below:

General formula (1)

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or —$SO_2NR_9R_{10}$, wherein each of $R_9$ and $R_{10}$ independently denotes a hydrogen atom, an alkyl group, an aryl group or an aralkyl group and may form a heterocycle with a nitrogen atom; n denotes an integer between 1 and 3; if neither $R_7$ nor $R_8$ is —$SO_2NR_9R_{10}$, at least one of said $R_1$ through $R_4$ is an alkylene group, an arylene group or an aralkylene group having —$SO_2NR_9R_{10}$ as a substituent; and An denotes a counter anion, which is not necessary when a counter anion exists in the molecule.

8. An ink tank as claimed in claim 4, wherein the colorant compound having a structure represented by the general formula (1) has a structure represented by the general formula (2) below:

General formula 2 where each of $R_9$ and $R_{10}$ independently denotes a hydrogen atom, an alkyl group, an aryl group or an aralkyl group and may form a heterocycle with a nitrogen atom.

9. An ink tank as claimed in claim 4, wherein the coloring liquid further contains a dispersant.

10. An ink tank as claimed in claim 4, wherein the coloring liquid further contains water.

11. A recording unit as claimed in claim 5, wherein the colorant compound having a structure represented by the general formula (1) has a structure represented by the general formula (2) below:

General formula 2 where each of $R_9$ and $R_{10}$ independently denotes a hydrogen atom, an alkyl group, an aryl group or an aralkyl group and may form a heterocycle with a nitrogen atom.

12. A recording unit as claimed in claim 5, wherein the coloring liquid further contains a dispersant.

13. A recording unit as claimed in claim 5, wherein the coloring liquid further contains water.

14. An ink jet recording apparatus as claimed in claim 6, wherein the colorant compound having a structure represented by the general formula (1) has a structure represented by the general formula (2) below:

General formula 2 where each of $R_9$ and $R_{10}$ independently denotes a hydrogen atom, an alkyl group, an aryl group or an aralkyl group and may form a heterocycle with a nitrogen atom.

15. An ink jet recording apparatus as claimed in claim 6, wherein the coloring liquid further contains a dispersant.

16. An ink jet recording apparatus as claimed in claim 6, wherein the coloring liquid further contains water.

17. An ink jet recording method as claimed in claim 7, wherein the colorant compound having a structure represented by the general formula (1) has a structure represented by the general formula (2) below:

General formula (2)

where each of $R_9$ and $R_{10}$ independently denotes a hydrogen atom, an alkyl group, an aryl group or an aralkyl group and may form a heterocycle with a nitrogen atom.

18. An ink jet recording method as claimed in claim 7, wherein the coloring liquid further contains a dispersant.

19. An ink jet recording method as claimed in claim 7, wherein the coloring liquid further contains water.

* * * * *